United States Patent
Stanga et al.

(10) Patent No.: US 8,168,714 B2
(45) Date of Patent: May 1, 2012

(54) (PER)FLUOROELASTOMERIC COMPOSITIONS

(75) Inventors: Milena Stanga, Origgio (IT); Giovanni Comino, Monza (IT); Margherita Albano, Milan (IT)

(73) Assignee: Solvay Solexis, S.p.A., Bollate Mi (IT)

( * ) Notice: Subject to any disclaimer, the term of this patent is extended or adjusted under 35 U.S.C. 154(b) by 503 days.

(21) Appl. No.: 12/307,061

(22) PCT Filed: Jun. 28, 2007

(86) PCT No.: PCT/EP2007/056477
§ 371 (c)(1),
(2), (4) Date: Dec. 30, 2008

(87) PCT Pub. No.: WO2008/003634
PCT Pub. Date: Jan. 10, 2008

(65) Prior Publication Data
US 2009/0286922 A1    Nov. 19, 2009

(30) Foreign Application Priority Data
Jul. 3, 2006 (IT) .............................. MI2006A1290

(51) Int. Cl.
*C08L 27/12* (2006.01)
(52) U.S. Cl. ...................... 524/544; 525/326.2; 525/387
(58) Field of Classification Search .................. 524/544; 525/326.2, 387
See application file for complete search history.

(56) References Cited

U.S. PATENT DOCUMENTS

| | | | |
|---|---|---|---|
| 5,187,222 A * | 2/1993 | Abe et al. ...................... | 524/492 |
| 6,642,331 B2 * | 11/2003 | Apostolo et al. ............... | 526/247 |
| 6,710,132 B2 * | 3/2004 | Apostolo et al. ............... | 525/199 |
| 6,803,402 B2 * | 10/2004 | Higashino et al. ............. | 524/430 |
| 7,488,787 B2 * | 2/2009 | Apostolo et al. ............... | 526/247 |
| 7,514,512 B2 * | 4/2009 | Apostolo et al. ............... | 526/247 |
| 2003/0088040 A1 * | 5/2003 | Arrigoni et al. ............... | 526/255 |
| 2005/0282969 A1 * | 12/2005 | Comino et al. ............ | 525/326.2 |

FOREIGN PATENT DOCUMENTS

| EP | 1304341 A2 * | 4/2003 |
| EP | 1308467 A2 * | 5/2003 |
| EP | 1 589 048 B1 | 10/2005 |

* cited by examiner

*Primary Examiner* — Peter D. Mulcahy
*Assistant Examiner* — Henry Hu
(74) *Attorney, Agent, or Firm* — Arent Fox LLP

(57) ABSTRACT

A (per)fluoroelastomeric composition curable by peroxidic way comprising:
  100 phr as (per)fluoroelastomer
  as filler, 0.5-50 phr of silica having a pH value, determined according to the DIN ISO 787-9 standard, higher than 7, preferably higher than 8,
  as crosslinking agent, from 0.5 to 10 phr of a bis-olefin having general formula:

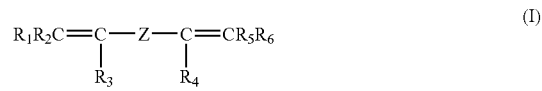

(I)

wherein:
  $R_1, R_2, R_3, R_4, R_5, R_6$, equal to or different from each other, are H or $C_1$-$C_5$ alkyls;
  Z is selected between a $C_1$-$C_{18}$ linear or branched alkylene or cycloalkylene radical, optionally containing oxygen atoms, preferably at least partially fluorinated, or a (per)fluoropolyoxyalkylene radical.

22 Claims, No Drawings

(PER)FLUOROELASTOMERIC COMPOSITIONS

CROSS-REFERENCE TO RELATED APPLICATION

This application is a National Stage entry of International Application No. PCT/EP/2007/056477, filed Jun. 28, 2007, the entire specification claims and drawings of which are incorporated herewith by reference.

The present invention relates to (per)fluoroelastomeric compositions having an improved combination of thermal resistance and sealing properties, as shown by the compression set at high temperatures, for example from 300° C. up to 350° C.

More specifically the invention refers to (per)fluoroelastomeric compositions which maintain an improved thermal resistance, as pointed out by the limited variation of the mechanical properties as stress at break, elongation at break, hardness and weight, even after long ageing times (for example 70 hours) at high temperatures, preferably from 320° C. to 350° C.

It is known that the curing of (per)fluoroelastomers can be carried out by ionic and/or by peroxide route.

In the ionic curing, suitable curing agents, for example polyhydroxylated compounds such as bisphenol AF, in combination with accelerating agents as for example tetraalkylammonium salts, phosphonium or aminophosphonium salts, are added to the (per)fluoroelastomer. In the peroxidic curing the polymer must contain cure sites capable to form radicals in the presence of peroxides. For this reason during the polymerization cure-site monomers containing iodine and/or bromine are introduced in the chain, as described for example in U.S. Pat. No. 4,035,565, U.S. Pat. No. 4,745,165 and EP 199,138. Alternatively or contemporaneously with the indicated system, chain transfer agents containing iodine and/or bromine can be used, producing iodinated and/or brominated end groups, see for example U.S. Pat. No. 4,243,770 and U.S. Pat. No. 5,173,553. The curing by peroxidic way is carried out according to known techniques, by addition of peroxides capable to generate radicals by heating, for example dialkylperoxides, as di-terbutyl-peroxide and 2,5-dimethyl-2,5-di (terbutylperoxy)-hexane, etc.

To the curing blend other compounds are then added, for example curing coagents, among which the most commonly used are triallyl-cyanurate and preferably triallyl-isocyanurate (TAIC), etc.; a metal compound, in amounts between 1 and 15% by weight with respect to the polymer, selected from divalent metal oxides or hydroxides, as for example Mg, Ca, etc.; other conventional additives, as mineral fillers, pigments, antioxidants, stabilizers and the like.

The ionically cured (per)fluoroelastomers are more stable than the (per)fluoroelastomers cured by peroxidic way when subjected to high temperatures (higher thermal resistance at high temperatures). In fact with the ionic curing, manufactured articles are obtained maintaining good final properties, in particular thermal resistance even at temperatures higher than 250° C.

The (per)fluoroelastomers cured by peroxidic way are used at lower temperatures, up to 230° C., since at higher temperatures they show an evident loss of the mechanical properties.

Peroxidic crosslinking systems of (per)fluoroelastomers containing iodine and/or bromine, wherein the crosslinking agent is a bis-olefin having general formula $R^I_1R^I_2C=C(R^I_3)—Z—C(R^I_4)=CR^I_5R^I_6$ (IB), are also known from U.S. Pat. No. 5,902,857 and U.S. Pat. No. 5,948,868. In the formula, the radicals R, equal to or different from each other, are H or alkyl; Z is a linear or branched alkylene or cycloalkylene radical, optionally containing oxygen atoms, preferably at least partially fluorinated, or a (per)fluoropolyoxyalkylene radical. The crosslinking systems described in these two patents allow to improve the thermal resistance of cured articles at high temperatures compared with systems wherein conventional crosslinking agents are used; however at temperatures of about 300° C. there is a substantial decrease of the mechanical properties of the cured articles. For example, the stress at break, which, as known, is one of the most important properties of (per)fluoroelastomers, suffers a decrease of 85% with respect to that determined before the thermal treatment at 300° C. Furthermore, it is well known that a (per)fluoroelastomer, to be able to be used at temperatures up to 350° C., must have good compression set properties. In the two above mentioned US patents only the compression set properties at 200° C. are reported.

U.S. Pat. No. 6,191,208 describes a crosslinkable perfluoroelastomeric composition comprising a perfluoroelastomer with TFE and perfluorovinyl ether units and a cure-site monomer containing nitrile groups; a curing system for the above cure-site and, as filler, anhydrous silica. In the patent it is stated that the anhydrous silica is generally an acid silica having a pH lower than 7, preferably between 4 and 5. The compositions of this patent show a reduced tendency to generate HF by heating at high temperatures. The examples report the compression set values determined at 200° C. for 336 hours. However this patent does not give any teaching as to the maintenance of the mechanical properties and of the compression set of the perfluoroelastomeric compositions at high temperatures, from 300° C. up to 350° C.

European patent application EP 1,632,526 describes a curing peroxidic system for perfluoroelastomers comprising:
 a bis-olefin having the above mentioned general formula (IB), in amounts from 0.6% to 1.8% as percent by weight on the polymer;
 a peroxide in amounts from 0.2% to 1.3% as percent by weight on the polymer.

Other components are added to the curing peroxidic system, in particular the following ones are mentioned: metal compounds; pigments; antioxidants; stabilizers; reinforcing fillers, and among these carbon black, barium sulphate, silicates, crystalline (per)fluoropolymers are mentioned. The examples show that the crosslinking system described in this patent application allows to obtain a good thermal resistance combined with good compression set values, at a temperature of 316° C. No examples are reported showing an improved thermal resistance, as pointed out by the variation of the mechanical properties, as stress at break, elongation at break, hardness and weight, even after long ageing times (for example 70 hours) at high temperatures, from 320° C. to 350° C.

The need was felt to have available cured manufactured articles having an improved combination of thermal resistance, as pointed out by the small variation of the mechanical properties as stress at break, elongation at break, hardness and weight, even after long ageing times (for example 70 hours) at high temperatures, higher than 300° C. and up to 350° C., preferably from 320° C. to 350° C., and improved compression set at the above high temperatures.

It has been surprisingly and unexpectedly found by the Applicant that it is possible to solve the above mentioned technical problem by using a particular (per)fluoroelastomeric composition, as described below.

An object of the present invention is a (per)fluoroelastomeric composition curable by peroxidic way comprising per 100 phr of (per)fluoroelastomer:

as filler, 0.5-50 phr, preferably 1-35 phr, more preferably 3-25 phr, of silica having a pH value, determined according to the DIN ISO 787-9 standard, higher than 7, preferably higher than 8;

as crosslinking agent, from 0.5 to 10 phr, preferably from 0.6 to 5, more preferably from 0.6 to 1.8 phr, still more preferably from 0.9 to 1.5 phr, of a bis-olefin having general formula:

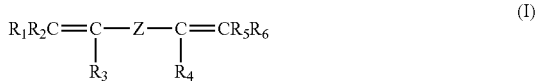
(I)

wherein:
$R_1, R_2, R_3, R_4, R_5, R_6$, equal to or different from each other, are H or $C_1$-$C_5$ alkyl;

Z is selected from a $C_1$-$C_{18}$ linear or branched alkylene or cycloalkylene radical, optionally containing oxygen atoms, preferably at least partially fluorinated, or a (per)fluoropolyoxyalkylene radical.

As silica (silicon dioxide) any silica can be used provided it has a pH value higher than 7, preferably higher than 8. Examples of silica usable in the compositions according to the present invention are the following, available on the market: Sipernat® D10, Ultrasil®360, Carplex®1120. The silica Carplex®120 is a crystalline silica with pH 11, wherein the silica amount is 90% by weight. The silica Sipernat® D10 has pH 10, with silica titre of about 98%. The silica Ultrasil®360 has pH 9, with silica titre of about 98%.

The silica is preferably in the range 1-35 phr, more preferably 3-25 phr.

The bis-olefin crosslinking agent preferably ranges from 0.6 to 5, more preferably from 0.6 to 1.8 phr.

In formula (I) of the bis-olefin, Z is preferably a $C_4$-$C_{12}$, more preferably $C_4$-$C_8$, perfluoroalkylene radical; when Z is a (per)fluoropolyoxyalkylene radical, it can comprise units selected from the following:
—$CF_2CF_2O$—, —$CF_2CF(CF_3)O$—, —$CFX_1O$— wherein $X_1$=F, $CF_3$, —$CF_2CF_2CF_2O$—, —$CF_2$—$CH_2CH_2O$—, —$C_3F_6O$—;
while $R_1, R_2, R_3, R_4, R_5, R_6$ are preferably hydrogen.

Preferably Z has formula:

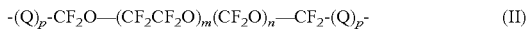
(II)

wherein: Q is a $C_1$-$C_{10}$ alkylene or oxyalkylene radical; p is 0 or 1; m and n are numbers such that the m/n ratio is between 0.2 and 5 and the number average molecular weight of said (per)fluoropolyoxyalkylene radical is in the range 300-10,000, preferably 700-2,000.

Preferably -Q- in the bis-olefin is selected from:
—$CH_2OCH_2$—; —$CH_2$—O—$(CH_2CH_2O)_sCH_2$—, s=1-3.

Preferably the bis-olefin has formula:

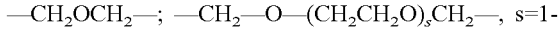

$CH_2$=CH—$(CF_2)_{t0}$—CH=$CH_2$, wherein $t0$ is an integer from 6 to 10.

The bis-olefins of formula (I) wherein Z is an alkylene or cycloalkylene radical can be prepared according to what described, for example, by I. L. Knunyants et al. in "Izv. Akad. Nauk. SSSR", Ser. Khim., 1964(2), 384-6, while the bis-olefins containing (per)fluoropolyoxyalkylene sequences are described in U.S. Pat. No. 3,810,874.

The (per)fluoroelastomers curable by peroxidic way with the crosslinking system according to the present invention are those containing peroxidic crosslinking sites. Preferably these sites are represented by iodine and/or bromine, preferably iodine atoms. See for example the perfluoroelastomers described in EP 769,521. The iodine and/or bromine atoms can be present along the backbone and/or as terminal end of the backbone. The amount of iodine/bromine is generally between 0.001% and 5% by weight, preferably between 0.01% and 2.5% by weight with respect to the total weight of the polymer. To introduce iodine atoms along the chain, the polymerization of the fluoroelastomer monomers is carried out with a suitable fluorinated comonomer containing iodine (cure-site monomers). See for example U.S. Pat. No. 4,745,165, U.S. Pat. No. 4,831,085, U.S. Pat. No. 4,214,060, EP 683,149. The cure-site can be selected for example from the following compounds:

(a) iodo(per)fluoroalkyl-perfluorovinylethers of formula:

(III)

wherein $R_f$ is a $C_1$-$C_{12}$ (per)fluoroalkylene, optionally containing chlorine and/or ether oxygen atoms;

for example: $ICF_2$—O—CF=$CF_2$, $ICF_2$—$CF_2$—O—CF=$CF_2$, $ICF_2CF_2CF$—O—CF=$CF_2$, $CF_3CFICF_2$—O—CF=$CF_2$, and the like;

(b) iodo-(per)fluoroolefins of formula:

(IV)

wherein $R'_f$ is a $C_1$-$C_{12}$ (per)fluoroalkylene, optionally confining chlorine atoms;

for example: iodotrifluoroethylene, 1-iodo-2,2-difluoroethylene, iodo-3,3,4,4-tetrafluorobutene-1,4-iodo-perfluorobutene-1, and the like;

(c) iodo-(per)fluoroolefins of formula:

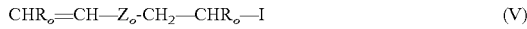
(V)

wherein: $R_o$ is H or —$CH_3$; $Z_o$ is a $C_1$-$C_{18}$ linear or branched (per)fluoroalkylene radical, optionally containing one or more oxygen atoms, or a (per)fluoropolyoxyalkylene radical as above defined.

Other cure-site iodinated comonomers are the iodofluoroalkylvinylethers, see U.S. Pat. No. 4,745,165 and U.S. Pat. No. 4,564,662.

Alternatively, or in addition to the iodinated comonomer, the fluoroelastomer can contain iodine atoms in end position, deriving from a suitable iodinated chain transfer agent introduced in the reaction medium during the fluoroelastomer polymerization, as described in U.S. Pat. No. 4,501,869. Said transfer agents have formula $R^A{}_f(I)_x$, wherein $R^A{}_f$ is a $C_1$-$C_{12}$ (per)fluoroalkyl radical, optionally containing chlorine atoms, while x is 1 or 2. Said transfer agents can be selected, for example, from: $CF_2I_2$, $I(CF_2)_6I$, $I(CF_2)_4I$, $CF_2ClI$, $CF_3CFICF_2I$, and the like. For the iodine introduced as chain end group by addition of iodinated chain transfer agents, as above mentioned, see for example U.S. Pat. No. 4,243,770 and U.S. Pat. No. 4,943,622.

It is also possible to use as chain transfer agents alkaline or alkaline-earth metal iodides, according to the patent application EP 407,937.

In combination with the chain transfer agents containing iodine, other known chain transfer agents of the prior art, as ethyl acetate, diethylmalonate, etc., can be used.

The iodine amount in end position of the (per)fluoroelastomer is generally between 0.001% and 3%, preferably between 0.01% and 1% by weight with respect to the fluoroelastomer weight. See U.S. Pat. No. 4,035,565 and U.S. Pat. No. 4,694,045.

Furthermore the (per)fluoroelastomers curable by peroxidic way can contain, alternatively or in combination with iodine, also bromine, in the chain and in end position. The bromine in the chain can be introduced by using a cure-site comonomer according to known techniques; see for example U.S. Pat. No. 4,035,565, U.S. Pat. No. 4,745,165, EP 199, 138; or as end bromine as described in U.S. Pat. No. 4,501, 869.

The (per)fluoroelastomers of the invention are TFE polymers with at least one perfluorinated olefin having one unsaturation of ethylene type. In particular the comonomers are selected from:

(per)fluoroalkylvinylethers (PAVE) $CF_2=CFOR_{2f}$, wherein $R_{2f}$ is a $C_1$-$C_6$ (per)-fluoroalkyl, for example trifluoromethyl, bromotrifluoromethyl, penta-fluoropropyl;

(per)fluoro-oxyalkylvinylethers $CF_2=CFOX_0$, wherein $X_0$ is: a $C_1$-$C_{12}$ perfluorooxyalkyl, containing one or more ether groups, for example perfluoro-2-propoxypropyl; (per)fluorovinylethers called MOVE having general formula:

$$CFX_2=CX_2OCF_2OR''_f \qquad (I\text{-}Ba)$$

wherein

R''$_f$ has the following meanings:
  $C_2$-$C_6$ linear or branched (per)fluoroalkyl,
  $C_5$-$C_6$ cyclic (per)fluoroalkyl,
  $C_2$-$C_6$ linear or branched (per)fluorooxyalkyl containing from one to three oxygen atoms,
$X_2$=F, H.

When in the (per)fluoroelastomers the comonomer is a (per)fluorovinylether of formula (I-Ba), it is preferably selected from the following:
  $CF_2=CFOCF_2OCF_2CF_3$ (MOVE1)
  $CF_2=CFOCF_2OCF_2CF_2OCF_3$ (MOVE2)
  $CF_2=CFOCF_2OCF_3$ (MOVE3).

Preferred monomeric compositions for curable (per)fluoroelastomers are the following, expressed in % by moles:
  TFE 50-85%, PAVE 15-50%;
  TFE 20-85%, MOVE 15-80%, optionally PAVE 0-50%;
the monomer sum being 100% by moles.

The fluorinated polymers of the present invention can optionally contain also units deriving from VDF, $C_3$-$C_8$ fluoroolefins, optionally containing hydrogen atoms, chlorine and/or bromine and/or iodine, $C_2$-$C_8$ non fluorinated olefins (Ol), preferably ethylene and/or propylene. Examples of the latter are:
  33-75% by moles of tetrafluoroethylene (TFE), preferably 40-60%; 15-45% by moles of a perfluorovinylether (PAVE), preferably 20-40%; 2-25% by moles of vinylidene fluoride (VDF), preferably 15-20%;
  TFE 32-60%, PAVE 2040%; Ol 10-40%;
the sum of the moles of the compositions being 100%.

As preferred perfluorovinylethers PAVE, (per)fluoromethylvinylether, perfluoroethylvinylether, perfluoropropylvinylether can be mentioned.

In the above mentioned (per)fluoroelastomeric compositions, at the place or in combination with the vinylethers PAVE, the (per)fluorovinylethers of formula (I-Ba) can be used, with the proviso that the total % of the vinylethers is within the limits indicated above for the above mentioned compositions containing PAVE.

The (per)fluoroelastomers can contain also monomeric units in the chain deriving from small amounts of a bis-olefin of the above reported general formula (I), as described in U.S. Pat. No. 5,585,449, generally the bis-olefin amount in the (per)fluoro-elastomer ranges from 0.01% to 5% by moles with respect to the polymer.

To the curing blend other components can optionally be added, for example the following:

a metal compound, in an amount between 0 and 15% by weight with respect to the polymer, selected from divalent metal oxides or hydroxides, such as for example Mg, Zn, Ca or Pb, optionally combined with a weak acid salt, as stearates, benzoates, carbonates, oxalates or phosphites of Ba, Na, K, Pb, Ca;

other conventional additives, as reinforcing fillers, pigments, antioxidants, stabilizers and the like. Among fillers, carbon black, barium sulphate, silicates, semicrystalline (per)fluoropolymers, for example selected between PTFE or PTFE modified with comonomers, can be mentioned.

The curable perfluoroelastomers contain the perfluoroelastomers and the curing agents.

The (per)fluoroelastomers of the invention, as said, are cured by peroxidic way. This is carried out according to known techniques, by addition of peroxides capable to generate radicals by heating. Among the most commonly used there are: dialkylperoxides, as for example di-terbutyl-peroxide and 2,5-dimethyl-2,5-di(terbutylperoxy)hexane; dicumyl peroxide; dibenzoyl peroxide; diterbutyl perbenzoate; di[1,3-dimethyl-3-(terbutylperoxy) butyl]-carbonate. Other peroxidic systems are described, for example, in the patent applications EP 136,596 and EP 410,351.

Generally the amount of peroxide used ranges from 0.1% to 5%, preferably from 0.2% to 3% by weight with respect to the polymer weight.

The preparation of the (per)fluoroelastomers of the present invention can be carried out by copolymerization of the monomers in aqueous emulsion according to well known methods of the prior art, in the presence of radical initiators (for example alkaline or ammonium persulphates, perphosphates, perborates or percarbonates), optionally with ferrous or silver salts, or other easily oxidizable metals. Surfactants, as for example (per)fluoroalkyl carboxylates or sulphonates (for example ammonium perfluorooctanoate) or (per)fluoropolyoxyalkylenic, or others known in the prior art are also present in the reaction medium.

At the end of the polymerization, the fluoroelastomer is isolated from the emulsion by conventional methods, as coagulation by addition of electrolytes or by cooling.

Alternatively, the polymerization reaction can be carried out in mass or in suspension, in an organic liquid wherein a suitable radical initiator is present, according to well known techniques.

The polymerization reaction is generally carried out at temperatures in the range of 25° C.-150° C., under pressure up to 10 MPa.

The preparation of the fluoroelastomers of the present invention is preferably carried out in aqueous emulsion in the presence of an emulsion, dispersion or microemulsion of perfluoropolyoxyalkylenes, as described in U.S. Pat. No. 4,789,717 and U.S. Pat. No. 4,864,006, which are herein incorporated by reference.

Optionally the (per)fluoroelastomers of the invention can be mixed with semicrystalline (per)fluoropolymers in an amount (% by weight referred to the total dry weight (per) fluoroelastomer+semicrystalline (per)fluoropolymer) from 0% to 70%, preferably from 0% to 50% by weight, still more preferably from 2% to 30% by weight. With semicrystalline (per)fluoropolymer it is meant a (per)fluoropolymer showing, besides the glass transition temperature Tg, at least a crystalline melting temperature. The semicrystalline (per)fluoropolymer is constituted by tetrafluoro-ethylene (TFE) homopolymers, or TFE copolymers with one or more monomers containing at least one unsaturation of ethylene type, in an amount from 0.01% to 10% by moles, preferably from 0.05% to 7% by moles.

Said comonomers having an ethylene unsaturation are both of hydrogenated and fluorinated type. Among those hydrogenated, ethylene, propylene, acrylic monomers, for example methylmethacrylate, (meth)acrylic acid, butylacrylate, hydroxyethylhexylacrylate, styrene monomers, can be mentioned.

Among fluorinated comonomers it can be mentioned:
  $C_3$-$C_8$ perfluoroolefins, as hexafluoropropene (HFP), hexafluoroisobutene;
  $C_2$-$C_8$ hydrogenated fluoroolefins, as vinyl fluoride (VF), vinylidene fluoride (VDF), trifluoroethylene, perfluoroalkylethylene $CH_2$=$CH$—$R_f$, wherein $R_f$ is a $C_1$-$C_6$ perfluoroalkyl;
  $C_2$-$C_8$ chloro- and/or bromo- and/or iodo-fluoroolefins, as chlorotrifluoroethylene (CTFE);
  (per)fluoroalkylvinylethers (PAVE) $CF_2$=$CFOR_f$, wherein $R_f$ is a $C_1$-$C_6$ (per)fluoroalkyl, for example $CF_3$, $C_2F_5$, $C_3F_7$;
  (per)fluoro-oxyalkylvinylethers $CF_2$=$CFOX$, wherein X is: a $C_1$-$C_{12}$ alkyl, or a $C_1$-$C_{12}$ oxyalkyl, or a $C_1$-$C_{12}$ (per)fluoro-oxyalkyl having one or more ether groups;
  (per)fluorodioxoles, preferably perfluorodioxoles.

PAVEs, in particular perfluoromethyl-, perfluoroethyl-, perfluoropropylvinylether and (per)fluorodioxoles, preferably perfluorodioxoles, are preferred comonomers.

Optionally the semicrystalline (per)fluoropolymer is coated by a shell of a semicrystalline (per)fluoropolymer containing bromine and/or iodine atoms in the chain deriving from brominated and/or iodinated comonomers, in an amount from 0.1% to 10% by moles referred to the total moles of the basic monomeric units of the semicrystalline (per)fluoropolymer core+shell, the semicrystalline (per)fluoropolymer in the core and in the shell can be of different composition. See EP 1,031,606.

The preparation of said semicrystalline (per)fluoropolymers is carried out by polymerization of the monomers in aqueous emulsion in the presence of an emulsion, dispersion or microemulsion of perfluoropolyoxyalkylenes, according to what de-scribed in U.S. Pat. No. 4,789,717 and U.S. Pat. No. 4,864,006. Preferably the synthesis is carried out in the presence of a perfluoropolyoxyalkylene microemulsion.

When the (per)fluoroelastomers of the present invention contain semicrystalline (per)fluoropolymers, mixing is preferably carried out by mixing in the desired ratios the (per)fluoroelastomer latex with the semicrystalline (per)fluoropolymer latex, then co-coagulating the obtained mixture as described in U.S. Pat. No. 6,395,834 and U.S. Pat. No. 6,310,142.

Alternatively the semicrystalline (per)fluoropolymer can be polymerized and then the (per)fluoroelastomer is polymerized on the (per)fluoropolymer particles. It is thus obtained a core-shell structure.

The Applicant has unexpectedly and surprisingly found that, by using as filler the silica as defined above in the (per)fluoroelastomers of the invention, an improved thermal resistance and improved compression set values at high temperatures, higher than 300° C., are obtained. Furthermore, as regards the thermal resistance, it has been unexpectedly and surprisingly found that the percent variation of the mechanical properties, indicated for example by the stress at break, the elongation at break, hardness and the weight loss of the cured articles after thermal treatment at high temperature (320° C.) for 70 hours, results quite lower in the (per)fluoroelastomeric compositions of the present invention compared to the known ones.

A further object of the present invention are also cured (per)fluoroelastomeric compositions obtainable from the curable compositions of the invention.

A further object of the present invention are cured manufactured articles obtainable from the curable compositions of the invention.

A further object of the present invention is the use of the curable compositions according to the present invention for obtaining manufactured articles usable at temperatures from 300° C. to 350° C., having an improved combination of thermal resistance and sealing properties (compression set).

The following Examples are given for illustrative and not limitative purposes of the present invention.

EXAMPLES pH Determination of the Silicon Dioxide

The pH is determined according to the DIN ISO 787-9 standard.

Example 1

Polymerization

In a 22 litre steel autoclave, equipped with stirrer working at 460 rpm there have been introduced, after evacuation, 14.5 litres of demineralized water and 145 ml of a microemulsion obtained by mixing:
  32 ml of a perfluoropolyoxyalkylene having average molecular weight 600 g/mole, having acid end group of formula:

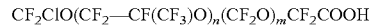

wherein n/m=10;
  32 ml of an aqueous solution of $NH_3$ at 30% by volume;
  62 ml of demineralized water;
  19 ml of Galden® D02 having average molecular weight of 450 g/mole and formula:

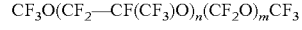

wherein n/m=20.

The autoclave was then heated to 80° C. and maintained at said temperature for the whole time of the reaction. Then 35 g of 1,4-diiodoperfluorobutane ($C_4F_8I_2$) were introduced in the autoclave.

The mixture of monomers having the following molar composition was then fed:
  tetrafluoroethylene (TFE) 35%;
  perfluoromethylvinylether (MVE) 65%;
so as to bring the pressure to 25 bar relative (rel) (2.5 MPa).

In the autoclave are then introduced:
  0.7 g of ammonium persulphate (APS) as initiator;
  18 g of bis-olefin of formula $CH_2$=$CH$—$(CF_2)_6$—$CH$=$CH_2$.

The bis-olefin addition was carried out in 20 portions, each of 0.9 g, starting from the polymerization beginning and for every 5% increase in the monomer conversion.

The pressure of 25 bar rel (2.5 MPa) was maintained constant for the whole duration of the polymerization by feeding a mixture having the following molar composition: tetrafluoroethylene (TFE) 60%, perfluoromethylvinylether (MVE) 40%.

After 160 minutes of reaction, corresponding to 100% of monomer conversion, the autoclave was cooled and the latex discharged.

The so obtained latex had a concentration equal to 290 $g_{polymer}/kg_{latex}$ and was used both in the Examples of the invention and in the comparative Examples.

The latex was coagulated by dripping it in a nitric acid solution. The obtained polymer was dried at 90° C. in an air-circulating oven for 16 hours.

The dried polymer is mixed with the following ingredients:
bis-olefin, having formula $CH_2=CH—(CF_2)_6CH=CH_2$;
2,5-dimethyl-2,5-di(terbutylperoxy)hexane Luperox®101;
silica;
optionally other fillers;
in the respective amounts (phr) indicated in Tables 1 and 2 for the examples according to the invention and for the comparative ones.

The so obtained blend was molded for 10 minutes at 170° C. and then characterized under the conditions indicated in Tables 1 and 2.

In the Tables Austin® Black and Sevacarb®MT-LS are commercial names indicating carbon black type reinforcing fillers.

In the Example 7 comparative (Table 2) Ultrasil®VN2 is a commercial silica having pH lower than 7, determined by the above mentioned method.

In the Example 8 comparative (Table 2), Ultrasil®VN3 is a commercial silica having pH lower than 7, determined by the above mentioned method.

In Table 2 the term "n.d." means that the value of the concerned parameter is not determinable: the sample degrades under the conditions in which the determination is carried out.

The Applicant has furthermore found that, if a silica not having the characteristics of that of the invention is used, a perfluoroelastomer is obtained, see example 7 comparative, which cannot be used at temperatures higher than 300° C. It has been found that the mechanical properties and the compression set of the perfluoroelastomers cannot be determined under said conditions since the sample degrades

TABLE 1

| Composition in phr | Ex. 2 | Ex. 3 | Ex. 4 | Ex. 5 | Ex. 6 comp |
|---|---|---|---|---|---|
| Polymer ex. 1 | 100 | 100 | 100 | 100 | 100 |
| bis-olefin | 1.5 | 1.5 | 1.5 | 1.5 | 1.5 |
| Luperox ®101 | 1.0 | 1.0 | 1.5 | 0.7 | 0.7 |
| Carplex ®1120 (SiO$_2$) | 10 | — | — | — | — |
| Sipernat ®D10 (SiO$_2$) | — | 10 | 25 | 5 | — |
| ZnO | — | — | — | — | 5 |
| Austin ® Black | — | — | — | — | 8 |
| Sevacarb ®MT-LS | — | — | — | — | 7 |
| Mechanical properties after post-treatment: 8 hours of gradient + 16 hours at 290° C. (ASTM D412C) | | | | | |
| Stress at break (MPa) | 14.2 | 12.3 | 19.0 | 9.2 | 16.5 |
| Elongation at break (%) | 301 | 275 | 150 | 350 | 224 |
| Hardness (Shore A) | 68 | 67 | 91 | 55 | 70 |
| Thermal treatment: 70 hours at 320° C. (ASTM D573) | | | | | |
| Δ % Stress at break | −40 | −41 | −40 | −35 | −65 |
| Δ % Elongation at break | +48 | +51 | +50 | +45 | +128 |
| Δ Hardness (Shore A) | −2 | −2 | −4 | −3 | −7 |
| Δ % Weight | −1.8 | −2.8 | −3.1 | −2.8 | −4.7 |
| Compression set: 70 hours at 316° C. (ASTM D395 method B) | | | | | |
| O-ring #214 | 41 | 40 | 50 | 49 | 70 |
| Compression set: 70 hours at 320° C. (ASTM D395 method B) | | | | | |
| O-ring #214 | 65 | 57 | 65 | 65 | 86 |

TABLE 2

| Composition in phr | Ex. 7 comp | Ex. 8 comp | Ex. 9 | Ex. 10 | Ex. 11 |
|---|---|---|---|---|---|
| Polymer ex. 1 | 100 | 100 | 100 | 100 | 100 |
| bis-olefin | 1.5 | 1.5 | 1.5 | 0.9 | 1.5 |
| Luperox ®101 | 1.5 | 1.0 | 1.0 | 1.5 | 1.0 |
| Ultrasil ®VN2 (SiO$_2$) | 15 | — | — | — | — |
| Ultrasil ®VN3 (SiO$_2$) | — | 10 | — | — | — |
| Carplex ®1120 (SiO$_2$) | — | — | — | — | — |
| Sipernat ®D10 (SiO$_2$) | — | — | 12 | 15 | 15 |
| ZnO | — | — | 3 | — | — |
| Sevacarb ®MT-LS | — | — | 5 | — | — |
| Mechanical properties after post-treatment: 8 hours of gradient + 16 hours at 290° C. (ASTM D412C) | | | | | |
| Stress at break (MPa) | 19.0 | 19.0 | 14.4 | 16.8 | 13.9 |
| Elongation at break (%) | 202 | 237 | 257 | 236 | 220 |
| Hardness (Shore A) | 79 | 71 | 77 | 72 | 76 |

TABLE 2-continued

| Composition in phr | Ex. 7 comp | Ex. 8 comp | Ex. 9 | Ex. 10 | Ex. 11 |
|---|---|---|---|---|---|
| Thermal treatment: 70 hours at 320° C. (ASTM D573) | | | | | |
| Δ % Stress at break | n.d* | n.d. | −40 | −33 | −38 |
| Δ % Elongation at break | n.d. | n.d. | +49 | +40 | +48 |
| Δ Hardness (Shore A) | n.d. | n.d. | −4.0 | −2.0 | −1.0 |
| Δ % Weight | n.d. | n.d. | −3.0 | −2.5 | −2.5 |
| Compression set: 70 hours at 316° C. (ASTM D395 method B) | | | | | |
| O-ring #214 | n.d | n.d. | 60 | 40 | 49 |
| Compression set: 70 hours at 320° C. (ASTM D395 method B) | | | | | |
| O-ring #214 | n.d. | n.d. | 68 | 56 | 56 |

(*not determinable)

The invention claimed is:

1. A (per)fluoroelastomeric composition curable by peroxidic way, comprising for 100 phr of (per)fluoroelastomer:
   as filler, 0.5-50 phr of silica having a pH value, determined according to the DIN ISO 787-9 standard, higher than 7;
   as crosslinking agent, from 0.5 to 10 phr of a bis-olefin having general formula:

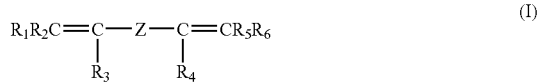

(I)

wherein:
   $R_1, R_2, R_3, R_4, R_5, R_6$, equal to or different from each other, are H or $C_1$-$C_5$ alkyls;
   Z is selected from a $C_1$-$C_{18}$ linear or branched alkylene or cycloalkylene radical, optionally containing oxygen atoms or a (per)fluoropolyoxyalkylene radical.

2. A curable (per)fluoroelastomeric composition according to claim 1, wherein the silica is in the range 1-35 phr.

3. A curable (per)fluoroelastomeric composition according to claim 1, wherein the bis-olefin ranges from 0.6 to 5.

4. A curable (per)fluoroelastomeric composition according to claim 1, wherein in the formula (I) Z is a $C_4$-$C_{12}$ perfluoroalkylene radical and $R_1, R_2, R_3, R_4, R_5, R_6$ are hydrogen; when Z is (per)fluoropolyoxyalkylene radical, it comprises units selected from the following: —$CF_2CF_2O$—, —$CF_2CF(CF_3)O$—, —$CFX_1O$— wherein $X_1$=$F_1$ $CF_3$, —$CF_2CF_2CF_2O$—, —$CF_2$—$CH_2CH_2O$—, —$C_3F_6O$—.

5. A curable (per)fluoroelastomeric composition according to claim 4, wherein Z has formula:

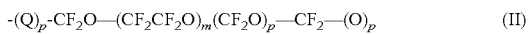

(II)

wherein: Q is a $C_1$-$C_{10}$ alkylene or oxyalkylene radical; p is 0 or 1; m and n are numbers such that the m/n ratio is between 0.2 and 5 and the molecular weight of said (per)fluoropolyoxyalkylene radical is in the range 500-10,000.

6. A curable (per)fluoroelastomeric composition according to claim 1, wherein the (per)fluoroelastomers contain peroxidic crosslinking sites.

7. A curable (per)fluoroelastomeric composition according to claim 6, wherein the peroxidic crosslinking sites comprise iodine and/or bromine, the iodine and/or bromine amount being between 0.001% and 5% by weight with respect to the total weight of the polymer.

8. A curable (per)fluoroelastomeric composition according to claim 7, wherein in the (per)fluoroelastomers the iodine and/or bromine atoms are in the chain and/or in end position.

9. A curable (per)fluoroelastomeric composition according to claim 1, wherein the (per)fluoroelastomers are TFE copolymers comprising recurring units derived from at least one perfluorinated olefin having one unsaturation of ethylene type.

10. A curable (per)fluoroelastomeric composition according to claim 9, wherein in the (per)fluoroelastomers the comonomer is selected from:
   (per)fluoroalkylvinylethers (PAVE) $CF_2$=$CFOR_{2f}$, wherein $R_{2f}$ is a $C_1$-$C_6$ (per)fluoroalkyl;
   (per)fluoro-oxyalkylvinylethers $CF_2$=$CFOX_0$, wherein $X_0$ is a $C_1$-$C_{12}$ perfluorooxyalkyl, containing one or more ether groups;
   (per)fluorovinylethers having general formula:

   (I-Ba)

wherein
   $R''_f$ has the following meanings:
      $C_2$-$C_6$ linear or branched (per)ffluoroalkyl,
      $C_5$-$C_6$ cyclic (per)fluoroalkyl,
      $C_2$-$C_6$ linear or branched (per)fluorooxyalkyl containing from one to three oxygen atoms,
   $X_2$=F, H.

11. A curable (per)fluoroelastomeric composition according to claim 10, wherein in the (per)fluoroelastomers when the comonomer is a (per)fluorovinylether of formula (I-Ba), it is selected from the following:
   $CF_2$=$CFOCF_2OCF_2CF_3$ (MOVE1)
   $CF_2$=$CFOCF_2OCF_2CF_2OCF_3$ (MOVE2)
   $CF_2$=$CFOCF_2OCF_3$ (MOVE3).

12. A curable (per)fluoroelastomeric composition according to claim 9, wherein the (per)fluoroelastomers have the following compositions expressed in % by moles:
   TFE 50-85%, PAVE 15-50%;
   TFE 20-85%, MOVE 15-80%, optionally PAVE 0-50%;
   the sum of the monomers being 100% by moles.

13. A curable (per)fluoroelastomeric composition according to claim 9, wherein the TFE copolymers contain units deriving from VDF, $C_3$-$C_8$ fluoroolefins, optionally containing hydrogen atoms, chlorine and/or bromine and/or iodine, $C_2$-$C_8$ non fluorinated olefins (Ol).

14. A curable (per)fluoroelastomeric composition according to claim 13, wherein the fluorinated polymers have the following compositions:
   33-75% by moles of tetrafluoroethylene (TFE); 15-45% by moles of a perfluorovinylether (PAVE); 2-25% by moles of vinylidene fluoride (VDF);
   TFE 32-60%, PAVE 20-40%; Ol 10-40%;
the sum of the moles of the compositions being 100%.

15. A curable (per)fluoroelastomeric composition according to claim 14, wherein at the place or in combination with PAVE, the (per)fluorovinylethers of formula (I-Ba) are used, the total % of the vinylethers being within the above indicated limits.

16. A curable (per)fluoroelastomeric composition according to claim 1, wherein the fluorinated polymers contain in the chain monomeric units deriving from a bis-olefin of formula (I).

17. A curable (per)fluoroelastomeric composition according to claim 16, wherein the bis-olefin amount ranges from 0.01% to 5% by moles with respect to the polymer.

18. A curable (per)fluoroelastomeric composition according to claim 1, optionally comprising other components, selected from:
- a metal compound, in an amount between 0 and 15% by weight with respect to the polymer, selected from divalent metal oxides or hydroxides, optionally combined with a weak acid salt;
- reinforcing fillers, pigments, antioxidants, stabilizers.

19. A curable (per)fluoroelastomeric composition according to claim 18, wherein the reinforcing fillers are selected from the group consisting of carbon black, barium sulphate, silicates, and semicrystalline (per)fluoropolymers.

20. A curable (per)fluoroelastomeric composition according to claim 1, wherein the perfluoroelastomeric or fluoroelastomeric polymers are in admixture with a semicrystalline (per)fluoropolymer in an amount, as percent by weight referred to the total dry weight (per)fluoroelastomer+semicrystalline (per)fluoropolymer, from 0% to 70%.

21. A curable (per)fluoroelastomeric composition according to claim 20, wherein the semicrystalline (per)fluoropolymer is constituted by tetrafluoroethylene (TFE) homopolymers, or TFE copolymers with one or more comonomers containing at least one unsaturation of ethylene type, in an amount from 0.01% to 10% by moles, said comonomers having one ethylene unsaturation being selected from the group consisting of hydrogenated comonomers and fluorinated type.

22. A curable (per)fluoroelastomeric composition according to claim 21, wherein the fluorinated comonomers are selected from the following:
- $C_3$-$C_8$ perfluoroolefins;
- $C_2$-$C_8$ hydrogenated fluoroolefins; perfluoroalkylethylene $CH_2=CH-R_f$, wherein $R_f$ is a $C_1$-$C_6$ perfluoroalkyl;
- $C_2$-$C_8$, chloro- and/or bromo- and/or iodo-fluoroolefins;
- (per)fluoroalkylvinylethers (PAVE) $CF_2=CFOR_f$, wherein $R_f$ is a $C_1$-$C_6$ (per)fluoroalkyl;
- (per)fluoro-oxyalkylvinylethers $CF_2=CFOX$, wherein X is: a $C_1$-$C_{12}$ alkyl, or a $C_1$-$C_{12}$ oxyalkyl, or a $C_1$-$C_{12}$ (per)fluoro-oxyalkyl having one or more ether groups;
- (per)fluorodioxoles.

* * * * *